(12) United States Patent
Alekseenko

(10) Patent No.: US 10,587,758 B1
(45) Date of Patent: Mar. 10, 2020

(54) METHOD AND SYSTEM FOR ROUTING CALL FROM ELECTRONIC DEVICE

(71) Applicant: YANDEX EUROPE AG, Lucerne (CH)

(72) Inventor: Elizaveta Aleksandrovna Alekseenko, Novosibirsk (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 16/571,931

(22) Filed: Sep. 16, 2019

(30) Foreign Application Priority Data

Dec. 18, 2018 (RU) ................................ 2018144802

(51) Int. Cl.
*H04M 7/00* (2006.01)
*H04M 3/493* (2006.01)
(Continued)

(52) U.S. Cl.
CPC ...... *H04M 7/0075* (2013.01); *G06Q 30/0246* (2013.01); *G06Q 30/0269* (2013.01);
(Continued)

(58) Field of Classification Search
CPC .. H04M 7/0075; H04M 7/003; H04M 3/4935; H04M 3/42068; H04M 2203/15; G06Q 30/0269; G06Q 30/0246
(Continued)

(56) References Cited

U.S. PATENT DOCUMENTS

| 8,699,370 | B2 | 4/2014 | Leung et al. |
| 9,641,680 | B1 * | 5/2017 | Wold ...................... G10L 17/00 |

(Continued)

FOREIGN PATENT DOCUMENTS

| CN | 102571872 A | 7/2012 |
| CN | 104301548 A | 1/2015 |

(Continued)

OTHER PUBLICATIONS

English Abstract for EP2608505 retrieved on Espacenet on Sep. 12, 2019.

(Continued)

*Primary Examiner* — Thjuan K Addy
(74) *Attorney, Agent, or Firm* — BCF LLP

(57) ABSTRACT

A computer-implemented method for routing a call from an electronic device to a target organization. The method is executed by a server coupled to a user profile database, a digital content display, a content item database, and a telephone number repository hosting a default telephone number and a pool of unique numbers. The method comprises receiving an indication of a user identifier associated with the user and determining whether the user profile database comprises data for generating a call enrichment data packet. In response to availability of the data generating the customized digital content item, routing the call to the default telephone number and including the call enrichment data packet. In response to non-availability of data for generating the call enrichment data packet, generating the customized digital content item comprising an indication of an available unique number and routing to an available unique number.

20 Claims, 6 Drawing Sheets

(51) Int. Cl.
*G06Q 30/02* (2012.01)
*H04M 3/42* (2006.01)

(52) U.S. Cl.
CPC ..... *H04M 3/42068* (2013.01); *H04M 3/4935* (2013.01); *H04M 7/003* (2013.01); *H04M 2203/15* (2013.01)

(58) Field of Classification Search
USPC ............ 379/218.01, 201.01, 207.13, 207.15, 379/265.09, 265.05
See application file for complete search history.

(56) References Cited

U.S. PATENT DOCUMENTS

| | | | |
|---|---|---|---|
| 2003/0182239 A1* | 9/2003 | Auzoux | G06Q 20/3674 705/64 |
| 2007/0294096 A1 | 12/2007 | Randall et al. | |
| 2008/0192736 A1* | 8/2008 | Jabri | G11B 27/034 370/352 |
| 2014/0207588 A1 | 7/2014 | Wong et al. | |
| 2015/0066633 A1 | 3/2015 | Agrawal et al. | |
| 2015/0128162 A1 | 5/2015 | Ionescu et al. | |
| 2016/0027058 A1 | 1/2016 | Saggi | |
| 2016/0100058 A1 | 4/2016 | Nelson et al. | |
| 2017/0178182 A1 | 6/2017 | Kuskey et al. | |

FOREIGN PATENT DOCUMENTS

| | | |
|---|---|---|
| EP | 2608505 A2 | 6/2013 |
| GB | 2490910 A | 11/2012 |
| WO | 2008040010 A2 | 4/2008 |
| WO | 14112989 A1 | 7/2014 |

OTHER PUBLICATIONS

English Abstract for CN104301548 retrieved on Espacenet on Sep. 12, 2019.

English Abstract for CN102571872 retrieved on Espacenet on Sep. 12, 2019.

* cited by examiner

METHOD AND SYSTEM FOR ROUTING CALL FROM ELECTRONIC DEVICE

CROSS-REFERENCE

The present application claims priority to Russian Patent Application No. 2018144802, entitled "Method and System for Routing Call from Electronic Device," filed on Dec. 18, 2018, the entirety of which is incorporated herein by reference.

FIELD

The present technology relates to routing calls in general and specifically to a method and a system for routing a call from an electronic device to a target organization.

BACKGROUND

When a user browses the internet (by using a browser application or simply a browser) and visits a webpage related to an organization, such as a service organization, an online store or the like, the browser may provide various digital content items on a user's electronic device. Alternatively, various digital content items may be provided to users on a public display (such as a billboard, an in-store display, and the like). For example, the digital content items may provide contact information for the user in case the user wants to contact the organization.

The digital content items may be personalized for each user so that vast statistical data may be collected about the users interacting with the digital content items. Such information may be used for assessment of targeting of digital content, in particular, an advertisement, for various groups of customers. The information may also be used for measuring success of various advertising campaigns and for targeting of future advertising campaigns.

For the digital content items related to telephone numbers, the full personalization may be costly. Personalizing a contact telephone number would require the organization to have available a large number of unique telephone numbers. On the other hand, using one telephone number for multiple calls and advertising campaigns cannot provide sufficient information about the users or about the efficiency of each advertising campaign. Although it is preferable to collect the information about the users in order to estimate and improve the efficiency of the advertisement, it is also desirable to reduce the cost of personalization of the digital content items, and, in particular, to reduce the number of telephone numbers used in the advertising campaign.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

It is an object of the present technology to provide improved method and system for routing a call from an electronic device to a target organization.

Current approach to determining the effectiveness of an advertisement campaign or a sub-campaign is based on providing to each caller a specific phone number in order to be able to track the user to the user's online actions. Another known approach is to embed an identifier within the phone call so that the embedded identifier can immediately serve as the identifier once the phone call is received, thereby allowing the phone number to be reused sooner.

Embodiments of the present technology have been developed based on developers' appreciation that providing each caller with a specific phone number is expensive, while the information to use in an identifier to be embedded in the phone call may not always be available.

The system and method as described herein receive the user identifier (ID) and determine whether the information about the caller is available in a user profile database. Based on the outcome of such verification, the system and method as described herein selectively choose between routing the user's call to a default telephone number and routing the user's call to an available unique telephone number. If the user profile database includes data for generating a call enrichment packet, the call is routed to a default telephone number along with the call enrichment packet for identifying the call as originating from the user. If the user profile database does not include data for generating the call enrichment packet, the call is routed to an available unique telephone from a pool of unique telephone numbers. Such selective approach may permit reducing the quantity of telephone numbers used during an advertising campaign and therefore may help to reduce the cost of telephone numbers in the advertising campaign. On the other hand, the described herein system and method permit collecting information about the users who contact a target organization by phone in response to the advertisement.

In accordance with a first broad aspect of the present technology, there is provided a computer-implemented method for routing a call from an electronic device, associated with a user, to a target organization. The method is executed by a server coupled to: a user profile database maintaining one or more user profiles of one or more users associated with one or more services; a digital content display; a content item database comprising a plurality of digital content items; and a telephone number repository hosting: a default telephone number and a pool of unique numbers. The method comprises: receiving a request for a customized digital content item from the content item database, the customized digital content item being destined to the user and not being personalized for the user; receiving an indication of a user identifier (ID) associated with the user; determining, based on the user ID, if the user profile database includes data for generating a call enrichment data packet associated with the call. The method further comprises, in response to availability of data for generating the call enrichment data packet: generating the customized digital content item comprising an indication of the default telephone number, the indication of the default telephone number including a trigger for including the call enrichment data packet when routing the call initiated by the user to the default telephone number; and in response to the user initiating the call, routing the call to the default number and including the call enrichment data packet for identifying the call as originating from the user in association with the customized digital content item. The method further comprises, in response to non-availability of data for generating the call enrichment data packet: generating the customized digital content item comprising an indication of one of the pool of unique numbers; mapping the customized digital content item and the one of the pool of unique numbers to the user ID and generating a mapping data of the customized digital content item, the one of the pool of unique numbers and the user ID; and in response to the user initiating the call: routing the call to the one of the pool of unique numbers; and using the mapping data for identifying the routed call as originated in response to the customized digital content item.

In some embodiments of the method, the digital content display is one of a user-independent digital content display and a user-specific digital display associated with the electronic device.

In some embodiments of the method, the user ID is one of a user-associated cookie and a device ID associated with the electronic device.

In some embodiments of the method, determining, based on the user ID, if the user profile database includes data for generating the call enrichment data packet comprises accessing the user profile database and determining if it stores information in association with the user-associated cookie or the device ID, the information being sufficient to identify at least one parameter associated with the user, the at least one parameter having been pre-defined by the target organization in association with the customized digital content item.

In some embodiments of the method, the mapping of the customized digital content item and the one of the pool of unique numbers to the user ID comprises maintaining the mapping for a pre-determined period of time after the customized digital content item has been displayed to the user.

In some embodiments of the method, upon expiry of the pre-determined period of time, the method further comprises: returning the one of the pool of unique numbers back to the pool of unique numbers. In some embodiments of the method, the returning causes dis-association of the one of the pool of unique numbers from the customized digital content item.

In some embodiments of the method, the method further comprises generating a conversion profile associated with the target organization, the conversion profile being based on occurrence of the call routed to the target organization in response to the displaying of the customized digital content item. In some embodiments of the method, a selective use of one of the default telephone number and the pool of unique numbers is instrumental in providing information for generating the conversion profile for the target organization.

In some embodiments of the method, the receiving of the indication of the user ID associated with the user is executed before routing the call. In some embodiments of the method, the receiving of the indication of the user ID associated with the user is executed during routing the call.

In some embodiments of the method, the method further comprises generating a database enrichment data packet comprising the mapping data; and storing the database enrichment data packet in the user profile database.

In some embodiments of the method, determining, based on the user ID, if the user profile database includes the data for generating a call enrichment data packet associated with the call further comprises: determining, based on data received from the user profile database, a most recent user profile corresponding to the user ID.

In accordance with another broad aspect of the present technology, there is provided a system for routing a call from an electronic device, associated with a user, to a target organization. The system comprises a server coupled to: a user profile database maintaining one or more user profiles of one or more users associated with one or more services; a digital content display; a content item database comprising a plurality of digital content items; a telephone number repository hosting: a default telephone number and a pool of unique numbers; and the server comprising a processor. The processor is configured to: receive a request for a customized digital content item from the content item database, the customized digital content item being destined to the user and not being personalized for the user; receive an indication of a user ID associated with the user; and determine, based on the user ID, if the user profile database includes data for generating a call enrichment data packet associated with the call. The processor is further configured to, in response to availability of data for generating the call enrichment data packet: generate the customized digital content item comprising an indication of the default telephone number, the indication of the default telephone number including a trigger for including the call enrichment data packet when routing the call initiated by the user to the default telephone number; and in response to the user initiating the call, route the call to the default number and include the call enrichment data packet for identifying the call as originating from the user in association with the customized digital content item. The processor is further configured to, in response to non-availability of data for generating the call enrichment data packet: generate the customized digital content item comprising an indication of one of the pool of unique numbers; map the customized digital content item and the one of the pool of unique numbers to the user ID and generate a mapping data of the customized digital content item, the one of the pool of unique numbers and the user ID; and in response to the user initiating the call: route the call to the one of the pool of unique numbers; and use the mapping data for identifying the routed call as originated in response to the customized digital content item.

In some embodiments of the system, the digital content display is one of a user-independent digital content display and a user-specific digital display associated with the electronic device. In some embodiments of the system, the user ID is one of a user-associated cookie and a device ID associated with the electronic device.

In some embodiments of the system, determining, based on the user ID, if the user profile database includes data for generating the call enrichment data packet comprises accessing the user profile database and determining if it stores information in association with the user-associated cookie or the device ID, the information being sufficient to identify at least one parameter associated with the user, the at least one parameter having been pre-defined by the target organization in association with the customized digital content item.

In some embodiments of the system, the processor is further configured to generate a conversion profile associated with the target organization, the conversion profile being based on occurrence of the call routed to the target organization in response to the displaying of the customized digital content item.

In some embodiments of the system, the system further comprises a call summary database configured to store the conversion profile associated with the target organization.

In some embodiments of the system, the user ID is a device ID, and the digital content display is a user-independent digital content display, the user-independent digital content display further comprising a sensor configured to detect the electronic device and to collect the device ID.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
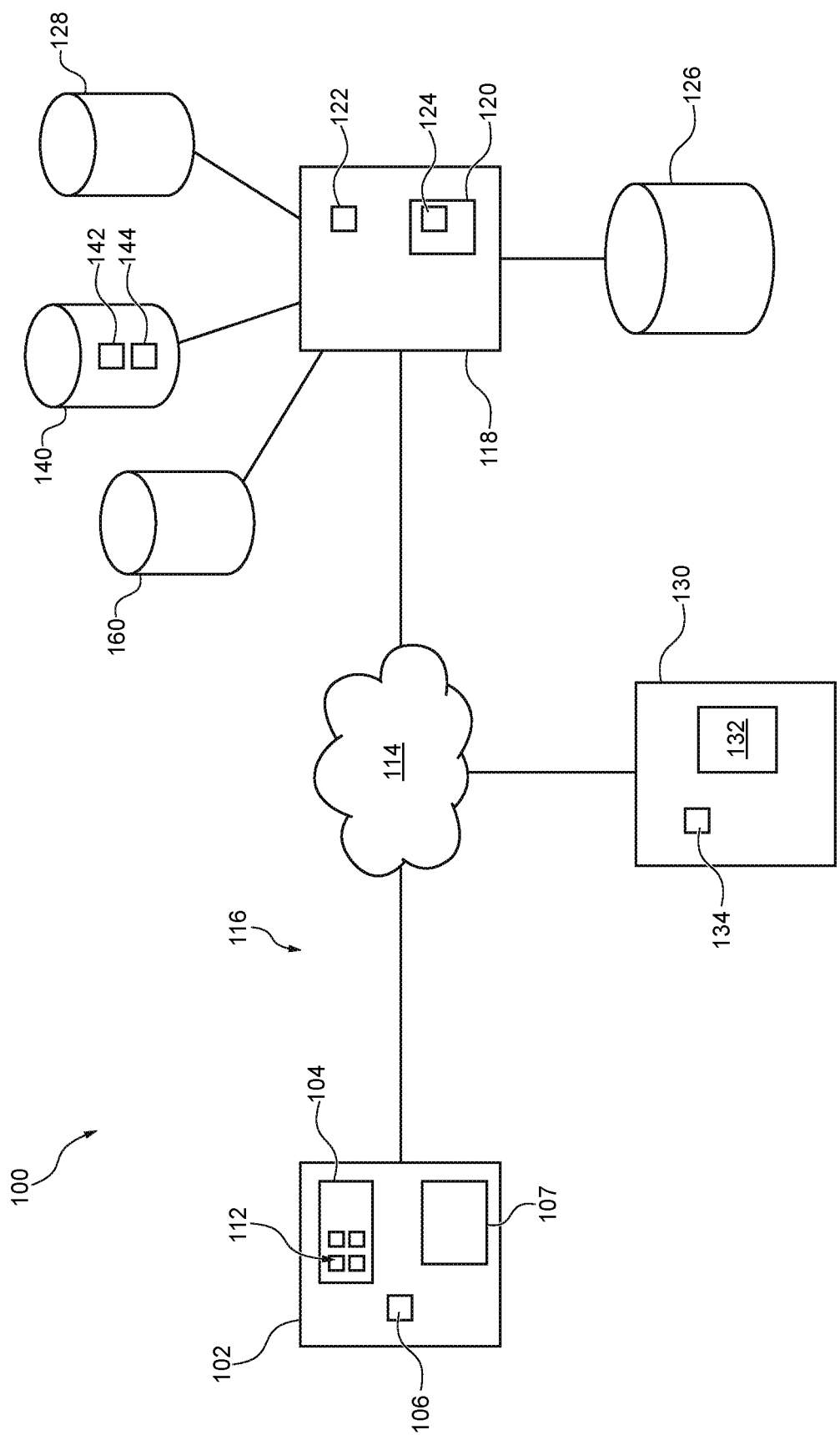
FIG. 1 depicts a schematic diagram of a system implemented in accordance with non-limiting embodiments of the present technology.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION OF THE NON-LIMITING EMBODIMENTS

Referring to FIG. 1, there is depicted a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application-specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

Referring again to FIG. 1, the electronic device 102 comprises a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 also comprises hardware and/or software and/or firmware (or a combination thereof) to execute one or more service applications 112. Generally speaking, the one or more service applications 112 correspond to electronic applications accessible by the electronic device 102. For example, the one or more service applications 112 may include a web browser application Yandex.Browser™, a news application Yandex.News™, a market application Yandex.Market™, and the like. Needless to say, the one or more service applications 112 may also comprise, for example, social media applications such as Vkontakte™, and music streaming applications such as Spotify™.

In some embodiments, the activities of the user executed on each of the one or more service applications 112 are tracked by one or more associated web servers (not shown), and are used to generate a profile of the user associated with the electronic device 102. In some embodiments, the one or more service applications 112 are configured to store the tracked activities with an indication of the unique user identification. For example, cookies and browsing history may be stored by the one or more service applications 112.

The electronic device 102 further comprises an electronic device display screen 107. The electronic device display screen 107 is a user-specific digital display, meaning that the information displayed on the electronic device display screen 107 is specifically directed or targeted to the user of the electronic device 102.

The electronic device 102 comprises a communication interface (not depicted) for enabling two-way communication with a communication network 114 via a communication link 116. In some non-limiting embodiments of the present technology, the communication network 114 can be implemented as the Internet. In other embodiments of the present technology, the communication network 114 can be implemented differently, such as any wide-area communication network, local area communications network, a private communications network and the like.

How the communication link 116 is implemented is not particularly limited and depends on how the electronic device 102 is implemented. Merely as an example and not as a limitation, in those embodiments of the present technology where the electronic device 102 is implemented as a wireless communication device (such as a smart phone), the communication link 116 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 102, the communication link 116 and the communication network 114 are provided for illustration purposes only. As such, those skilled in the art will easily appreciate other specific implementational details for the electronic device 102, the communication link 116, and the communication network 114. As such, by no means the examples provided herein above are meant to limit the scope of the present technology.

The electronic device 102 has a unique device identifier ("device ID"). In some embodiments of the present technology, this device ID may be detected by the nearby sensors, as described below.

The system 100 further includes a server 118 coupled to the communication network 114. The server 118 can be implemented as a computer server. In an example of an embodiment of the present technology, the server 118 can be implemented as a Dell™ PowerEdge™ Server running the Microsoft™ Windows Server™ operating system. Needless to say, the server 118 can be implemented in any other suitable hardware and/or software and/or firmware or a combination thereof. In the depicted non-limiting embodiment of the present technology, the server 118 is a single server. In alternative non-limiting embodiments of the present technology, the functionality of the server 118 may be distributed and may be implemented via multiple servers.

The server 118 comprises a communication interface (not depicted) structured and configured to communicate with various entities (such as the electronic device 102 and other devices potentially coupled to the communication network 114) via the communication network 114. The server 118 comprises a server memory 120 which comprises one or more storage media and generally provides a place to store computer-executable program instructions executable by a server processor 122. By way of example, the server memory 120 may be implemented as a tangible computer-readable storage medium including Read-Only Memory (ROM) and/or Random-Access Memory (RAM). The server memory 120 may also include one or more fixed storage devices in the form of, by way of example, hard disk drives (HDDs), solid-state drives (SSDs), and flash-memory cards.

In accordance with the non-limiting embodiments of the present technology, the server 118 is configured to execute a digital content item selection application 124 (also referred to herein as the "selection application 124"). The selection application 124 is configured to determine whether to route the call of the user to a default telephone number or to a unique telephone number based on the received user ID. The user ID may be any identification related to the user and/or the electronic device 102. For example, the user ID may be a user-associated cookie, the device ID associated with the electronic device 102, or the both.

Referring again to FIG. 1, the server 118 is communicatively coupled to a digital content item database 126. In alternative embodiments, the digital content item database 126 may be communicatively coupled to the server 118 via the communication network 114. Although the digital content item database 126 is illustrated schematically herein as a single entity, it is contemplated that the digital content item database 126 may be configured in a distributed manner.

The digital content item database 126 is populated with a plurality of digital content items (not separately numbered). The nature of each of the plurality of digital content item is not particularly limited. Broadly speaking, a digital content item may correspond to an advertisement, comprising one or more sentences, images, videos, etc.

The manner in which the digital content item database 126 is populated is not limited. Just as an example the digital content item database 126 may receive the digital content items from one or more advertising organizations, one or more companies, etc.

With continued reference to FIG. 1, the server 118 is further coupled to a user profile database 128 via a dedicated link (not numbered). In alternative non-limiting embodiments of the present technology, the user profile database 128 may be communicatively coupled to the server 118 via the communication network 114. Although the user profile database 128 is illustrated schematically herein as a single entity, it is contemplated that the user profile database 128 may be configured in a distributed manner.

Generally speaking, the user profile database 128 is a repository of one or more user profiles (not depicted). How the one or more user profiles are implemented is not limited, and may for example be a set of vectors representing the interests and personal data of a given user.

Without limiting the embodiments of the present disclosure, the user profile may include demographic data related to the user such as, for example: gender, age, group of age (for example, 20 to 25 years, 30 to 35 years old, etc.), matrimonial status, consumer preferences, income, purchases, recent purchases, etc. It should be understood that this and other data with regards to the user and the user preferences may be characterized or summarized in a corresponding vector.

Each user profile includes one or more device identifiers of the electronic devices (each referred to herein as a "device ID") from which the user has logged in. Alternatively, there may be different user profiles for each electronic device from which one user has ever logged in, and thus the same user may have several different user profiles.

Each user profile may also include a unique user identifier that is related to a particular user profile and may permit to find the corresponding user profile in the user profile database 128 at any time.

In at least one non-limiting embodiment of the present technology, the selection application 124 is configured to access the user profile database 128 in order to determine if the user profile database 128 includes one or more user profiles corresponding to the user ID received by the selection application 124 from the electronic device 102 or from the external display device 130.

Figure 2:
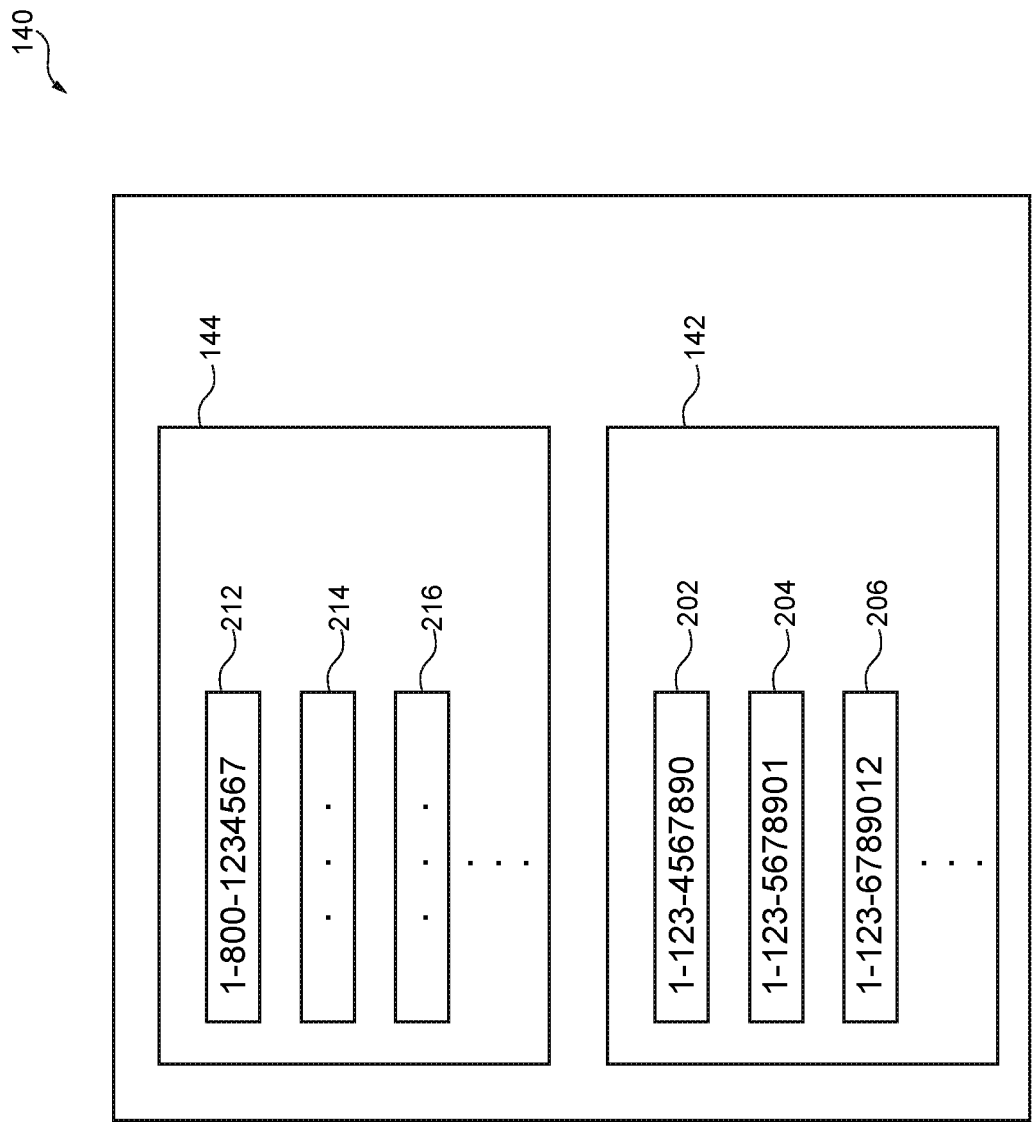
FIG. 2 depicts schematic illustration of a telephone number repository implemented in accordance with non-limiting embodiments of the present technology.

Referring again to FIG. 1, the server 118 may be operatively connected to a telephone number repository 140. With reference to FIG. 2, depicted therein is the telephone number repository 140 in further detail.

The telephone number repository 140 comprises a pool of unique telephone numbers 142 (also referred to herein as a "pool of unique numbers 142") and a pool of default telephone numbers 144 (also referred to herein as a "pool of default numbers 144").

It should be noted that an advertising campaign may take place with regards to one product, while its several sub-campaigns may each provide different digital image with regards to the same product. For example, each sub-campaign may target different audience or a different location. Moreover, different advertisements may be used within one sub-campaign.

In order to provide information about efficiency of the specific advertisement, the specific advertising campaign or the sub-campaign, each phone call needs to be identified as being motivated by the specific advertisement. The information about the user, such as the one from the user profile database, would provide additional information needed for the analysis of the advertising campaign.

Referring again to FIG. 2, the pool of unique numbers 142 comprises unique telephone numbers (for example, a first unique telephone number 202, a second unique telephone number 204, and a third unique telephone number 206). The server 118 populates the pool of unique numbers 142 each having a corresponding indication of the unique number.

In at least one embodiment of the present technology, the unique telephone numbers are provided to the electronic device 102 when the selection application 124 cannot find any user profile with regards to the particular user (particular user ID received) in the user profile database 128 and therefore cannot identify the user and/or his electronic device 102. Without the corresponding user profile, the selection application 124 cannot provide any user-profile-related information about the caller to the target organization (advertiser).

Routing the user's call to the unique number may permit collecting information about the particular advertising campaign or sub-campaign that motivated the user to contact the target organization. The unique number is assigned to one call and therefore additional information with regards to the particular advertisement of the target organization may be collected. Moreover, when the user dials the unique number, it becomes possible to directly track the electronic device of the user.

Routing the user's call to the unique telephone number may also help to start collecting information about this user in the user profile database 128. The information collected about the user during one call may include, for example, the user ID, the fact of the call, timing of the call, duration, the target organization the user has contacted, session cookies, and any available information about the target organization and the advertising campaign, including, for example, type of business of the target organization. Such information may be used to generate a new user profile in the user profile database 128. The new user profile may be searchable for any future advertising campaigns of any target organization.

It should be noted that, in some embodiments, one unique number may correspond to one telephone line per user.

The pool of default numbers 144 comprises a first default telephone number 212, a second default telephone number 214, and a third default telephone number 216. One target organization may have one default number. In at least one embodiment, one target organization may have one default number for each advertising campaign or one default number in general. In alternative non-limiting embodiments of the present technology, one target organization may have one default number for each platform for each advertising campaign.

Providing the same default telephone number for different advertising campaigns or advertisements without technology described herein would not permit determining which one of the advertising campaigns or sub-campaigns motivated the user to call the target organization, and would not permit collecting session cookies. Moreover, traditional methods would not permit collecting information about the caller, the advertising campaign, or the sub-campaign when one default telephone number is used with regards to different advertising campaigns and/or sub-campaigns. However, as discussed above, using a unique number for each call is expensive for the target organization, because of the cost of renting of each telephone number from a telephone line provider.

The method and system, as described herein, permit routing the calls of multiple users to one default number for different advertisements, advertising campaigns or sub-campaigns. At the same time, the method and system, as described herein, permit identifying the caller and the electronic device, from which the default number was dialed, and collecting the information on the call, the advertising campaign, sub-campaign, and the user, in order to analyze the efficiency of the advertising campaign or sub-campaigns.

It should be understood that, in some embodiments, the default number may correspond to a telephone line that permits receiving a plurality of phone calls from various users at the same time (such as a call center number or the like). For example, the default telephone number may be dialed at the same time by different users and the conversations may be maintained at the same time between each pair of a user and a representative of the organization. Therefore, the default number may be provided to multiple users simultaneously without a risk of having the telephone line busy. For example, the default number may be associated with a trunk telephone line of the organization.

It should be understood that the telephone lines referred to herein may be implemented with any technology that provides delivering of voice communications. For example, telephone numbers may be assigned to telephone lines implemented with traditional digital telephony, as well as voice over internet protocol (voice over IP) technologies.

As depicted in FIG. 1, the server 118 is further coupled to a call summary database 160 via a dedicated link (not numbered). In alternative non-limiting embodiments of the present technology, the call summary database 160 may be communicatively coupled to the server 118 via the communication network 114. Although the call summary database 160 is illustrated schematically herein as a single entity, it is contemplated that the call summary database 160 may be configured in a distributed manner. Furthermore, the call summary database 160 may be implemented as a portion of the user profile database 128.

The call summary database 160 may comprise a collection of call-related data for one or more target organizations with regards to one or more advertising campaigns and sub-campaigns. The data in the call summary database 160 may be generated and updated based on the received and treated requests, as well as based on the routed calls by the selection application 124.

For example, the call summary database 160 may store call enrichment data packets, database enrichment data packets, and conversion profiles associated with the target organizations and their advertising campaigns, as described below.

With continued reference to FIG. 1, the server 118 is further coupled to an external display device 130. How the external display device 130 is implemented is not limited, and may for example, be implemented as an outdoor advertising structure, such as an electronic billboard placed near a highway or a bus stop, or as an indoor advertising structure, such as an electronic billboard within a metro station or within a store.

Depending on the intended use location, the implementation of the external display device 130 will differ. In those non-limiting embodiments where the external display device 130 is implemented indoor, such as in a mall or a store, the external display device 130 may comprise a sensor 134 and a camera 136.

The sensor 134 is configured to detect wireless signals from one or more electronic devices (e.g. WiFi enabled devices, cellular phones, Bluetooth enabled devices, etc.) when located in range of the sensor 134, and collect the following data for each detected signal: a Media Access Control (MAC) address(es), signal strength, time of detection and the unique device ID (if different than the MAC address). An example of collecting the data for each detected signal is disclosed in U.S. Pat. No. 8,699,370 entitled METHOD AND APPARATUS FOR ANALYSIS OF USER TRAFFIC WITHIN A PREDEFINED AREA issued Apr. 15, 2014, the content of which is incorporated by reference herein in its entirety. Although in the depicted embodiment, only one sensor 134 is present, it is not limited as such, and may include more than one sensor.

How the camera 136 is implemented is not limited. For example, the camera 136 can include an optical sensor (e.g. a charged coupled device (CCD), or a complementary metal-oxide semiconductor (CMOS) image sensor), to facilitate camera functions, such as recording photographs and video clips. Even though in the depicted embodiment, only the camera 136 is present, in alternative embodiments, more cameras may be implemented.

Figure 3:
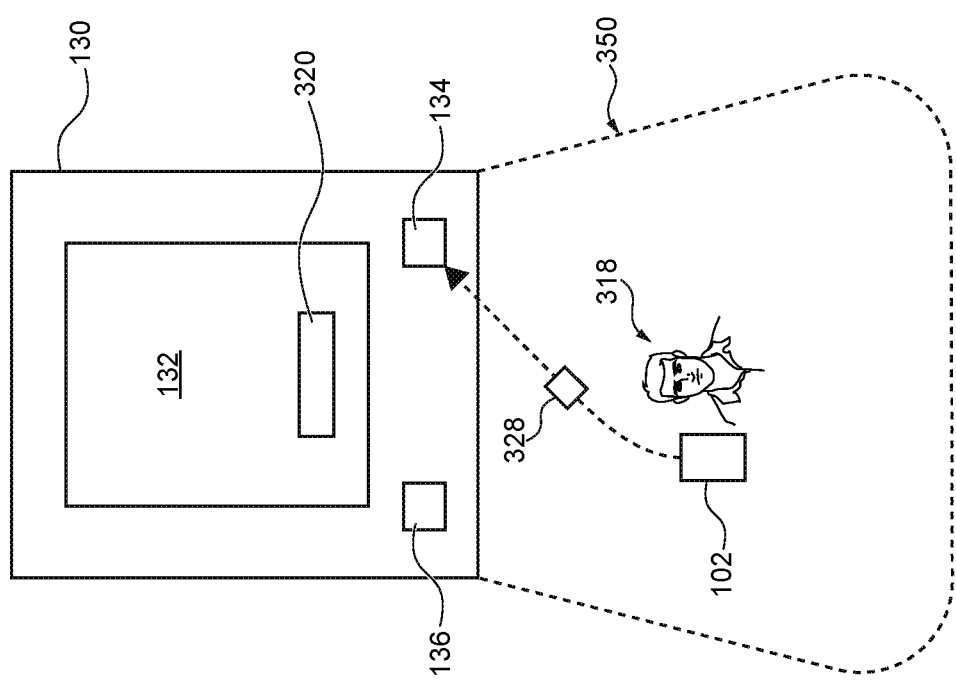
FIG. 3 depicts a schematic illustration of an external display screen, in accordance with non-limiting embodiments of the present technology.

FIG. 3 depicts a schematic illustration of an external display device 130 being implemented in accordance with embodiments of the present technology. The external display device 130 may be installed outside, such as next to a road, or within a building, such as inside a mall, a shop, and the like. The external display device 130 comprises the external display screen 132 and the sensor 134.

The external display device 130 is associated with an exposure perimeter 350. The exposure perimeter 350 may correspond to an area to which the external display screen 132 is clearly visible. The manner in which the exposure perimeter 350 is determined is not limited, and may depend on the dimensions of the external display screen 132.

Inside the exposure perimeter 350 of the external display screen 132, there is a user 318. The user 318 carries an electronic device 102 (such as a cell phone). Needless to say, it is contemplated that more users may be in front of the external display screen 132, and more electronic devices may be carried by the user 318.

As described above, the sensor 134 is configured to detect the electronic device 102. More precisely, the sensor 134 is configured to collect a user proximity identifier 328 associated with the electronic device 102. For example, the user proximity identifier 328 may comprise the unique identifier (such as the MAC address) of the electronic device 102 (electronic device identifier, also referred to herein as "device ID"), the signal strength, and the time of the detection.

The sensor 134 is then configured to transmit the user proximity identifier 328, which also comprises the device ID, to the selection application 124. The sensor 134 is further configured to periodically detect the signals of the electronic device 102 and transmit them to the selection application 124. The camera 136 may be used instead of the sensor 134 or to supplement the data collected by the sensor 134 in order to make more accurate determination of the user.

In some embodiments, the external display screen 132 is user-independent digital content display. This means that the information displayed on the external display device 130 is generally not targeted to any specific user or is targeted to a group of users (rather than being targeted to each individual user).

The external display device 130 is configured to receive an initial digital content item 320 for display at an external display screen 132. The initial digital content item 320 may be non-user-specific, meaning that the selection application 124 does not select the initial digital content item 320 to be targeted to a specific user.

The system and method described herein may be implemented both for non-used-specific digital content display, such as the external display screen 132, and for the electronic device display screen 107 of the electronic device 102, which is user-specific digital content display.

Figure 4:
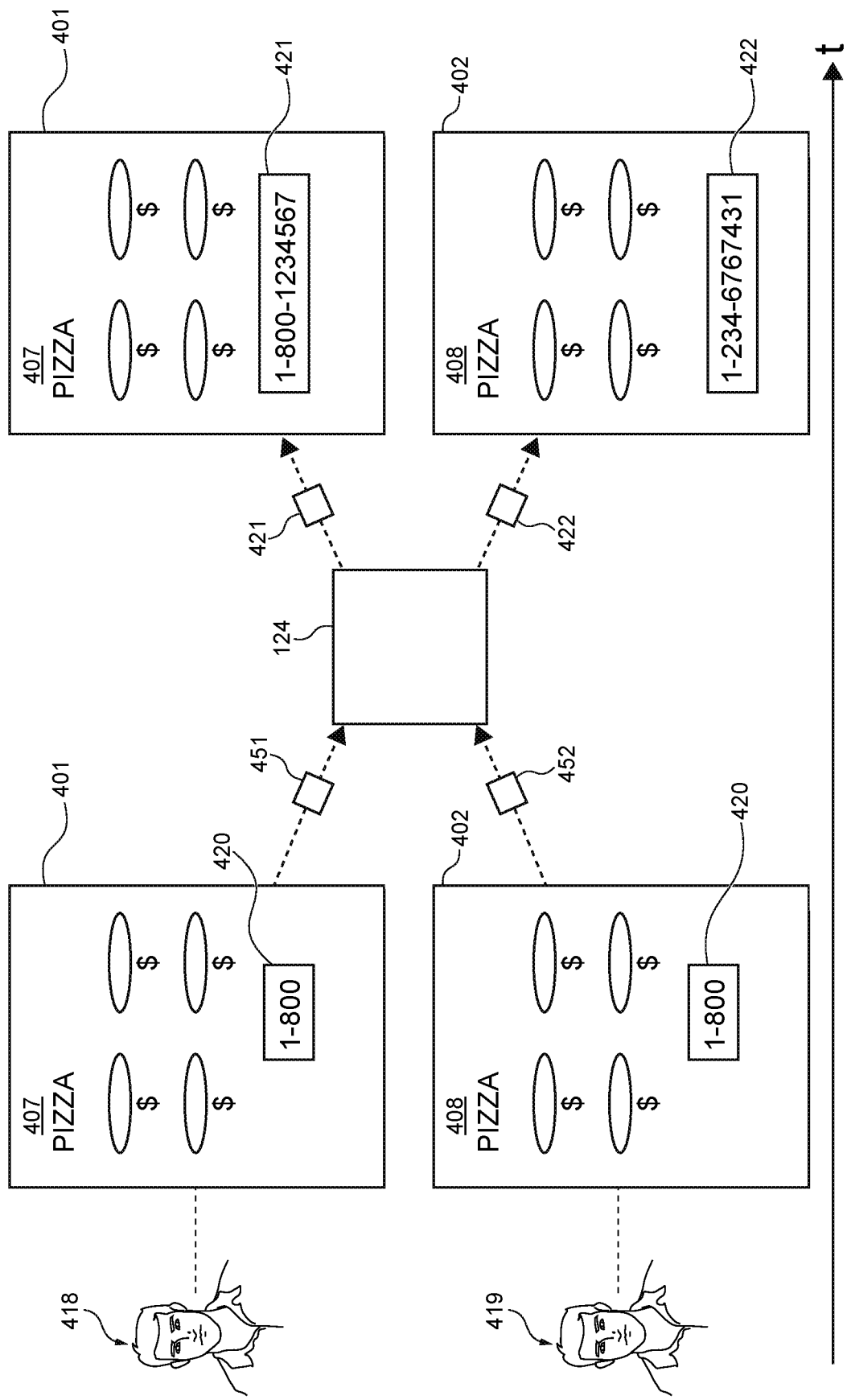
FIG. 4 illustrates two electronic devices before (left) and after (right) execution of the selection application, implemented in accordance with non-limiting embodiments of the present technology.

FIG. 4 illustrates a first electronic device 401 of a first user 418 and a second electronic device 402 of a second user 419 before (left) and after (right) execution of the selection application 124, in accordance with non-limiting embodiments of the present technology. The first electronic device 401 and the second electronic device 402 have a first digital content display 407 and a second digital content display 408, respectively. The first digital content display 407 and the second digital content display 408 are configured to display an initial selection item 420. The initial selection item 420 may be, for example, an image and/or a partial telephone number. The implementation of the initial selection item 420 may suggest that this item needs to be selected in order to contact the target organization by phone.

When the selection item 420 is selected by the first user 418, the first electronic device 401 transmits to the server 118 a first request 451 for a first customized digital content item for the first user 418. When the selection item 420 is selected by the second user 419, the second electronic device 402 transmits to the server 118 a second request 452 for a second customized second digital content item for the second user 419.

After execution of the selection application 124, the first electronic device 401 and the second electronic device 402 receive from the server and display different customized digital content items: a first digital content item 421 is displayed by the first electronic device 401, while the second electronic device 402 receives and displays a second digital content item 422. The difference between the first digital content item 421 and the second electronic device 402, which depends on the user IDs (not depicted) transmitted to the selection application 124 along with the first request 451 for the first customized digital content item for the first user 418 and the second request 452 for the second customized digital content item for second user 419, will be described herein below.

Although the embodiments of the present technology apply to the user-independent digital content display (such as external display device 130, depicted in FIGS. 1 and 3) and the user-specific digital content display, the system and methods will be described herein with the reference to the user-specific digital content display (such as the first digital content display 407 and the second digital content display 408, depicted in FIGS. 1 and 4).

Figure 5:
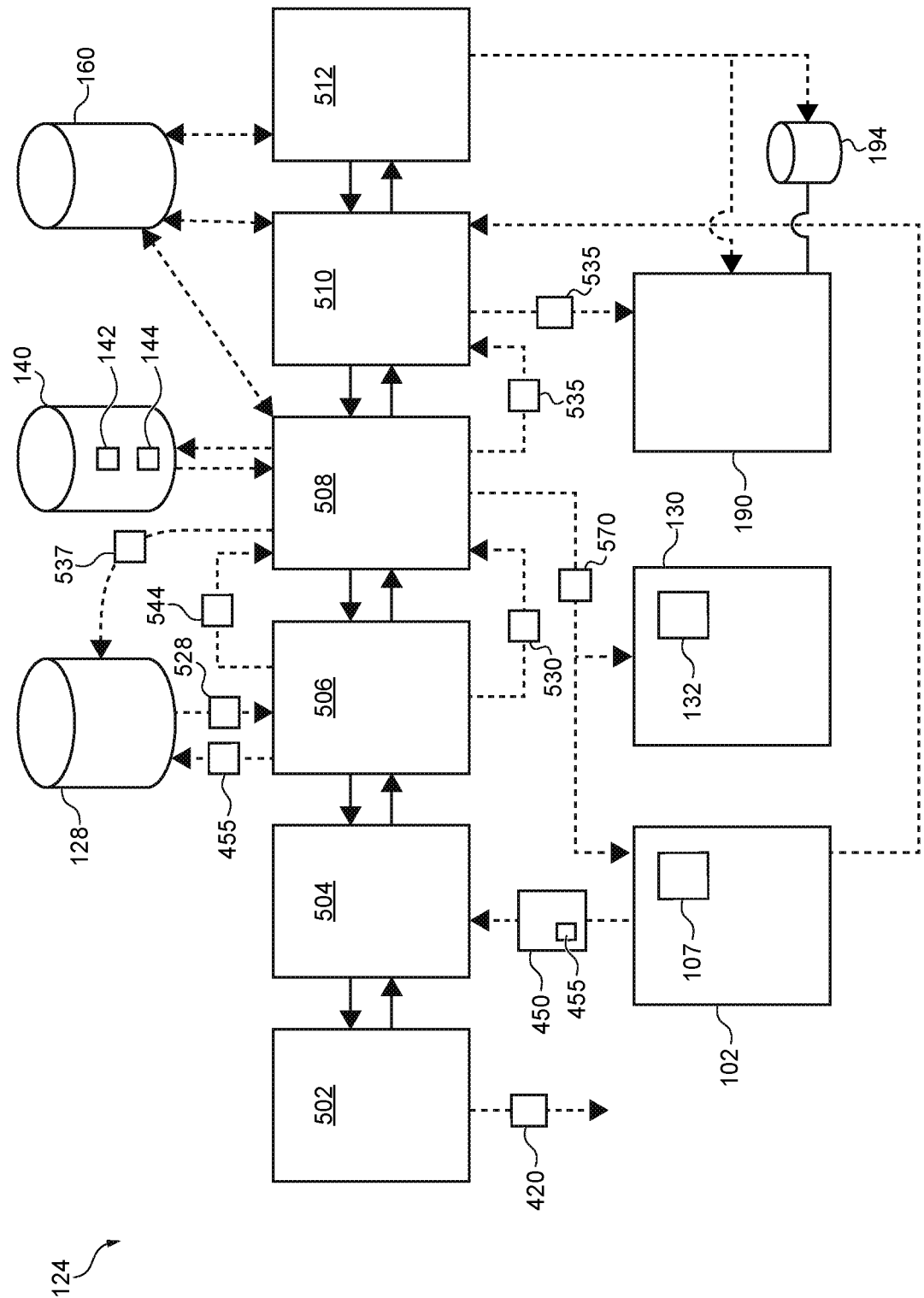
FIG. 5 depicts a schematic illustration of the selection application and its communication with an electronic device, an external display device and a target organization receiver, in accordance with non-limiting embodiments of the present technology.

With reference to FIG. 5, there is depicted a schematic illustration of the selection application 124 being implemented in accordance with non-limiting embodiments of the present technology. The selection application 124 executes (or otherwise has access to): an initial content selection routine 502, a receiving routine 504, a personalization routine 506, a content generation routine 508, a call routing routine 510, and an analyzing routine 512.

In the context of the present specification, the term "routine" refers to a subset of the computer executable program instructions of the selection application 124 that is executable by the server processor 122 to perform the functions explained below in association with the various routines (the initial content selection routine 502, the receiving routine 504, the personalization routine 506, the content generation routine 508, call routing routine 510, and analyzing routine 512). For the avoidance of any doubt, it should be expressly understood that the initial content selection routine 502, the receiving routine 504, the personalization routine 506, the content generation routine 508, call routing routine 510, and analyzing routine 512 are illustrated schematically herein as separate entities for ease of explanation of the processes executed by the selection application 124. It is contemplated that some or all of the initial content selection routine 502, the receiving routine 504, the personalization routine 506, the content generation routine 508, call routing routine 510, and analyzing routine 512 may be implemented as one or more combined routines.

For ease of understanding the present technology, functionality of each one of the initial content selection routine 502, the receiving routine 504, the personalization routine 506, the content generation routine 508, call routing routine 510, and analyzing routine 512, as well as data and/or information processed or stored therein are described below.

The initial content selection routine 502 is configured to select the selection item 420 from the digital content item database 126. An overall digital item, such as, for example, a digital advertisement of the target organization, may also be selected from the digital content item database 126 and may include the selection item 420. The initial content selection routine 502 may then transmit the selection item 420 alone or together with the overall digital item to the electronic device 102.

As described above, the implementation of the initial selection item 420 may suggest that this item needs to be selected in order to contact the target organization by phone. The initial selection item 420 may be, for example, an image and/or a partial telephone number.

In some embodiments, the initial content selection routine 502 may select the partial telephone number by analyzing telephone numbers of the telephone number repository 140. For example, the initial content selection routine 502 may analyze the pool of unique numbers 142 and/or the pool of default numbers 144, corresponding to the target organization and/or corresponding to the target organization's advertising campaign.

For example, the initial content selection routine 502 may select a sequence of several first digits based on various predetermined criteria. For example, a sequence of several first digits may be an area code and a prefix (the first set of digits of the telephone number, following the country code and the area code), or a prefix only. For example, the partial telephone number may be selected based on being the most commonly used sequence of the first several digits of the unique numbers or default numbers related to the target organization and/or target organization's advertising campaign. Selecting the most commonly used sequence of the first several digits of the unique numbers and/or default numbers and providing them to the user may help to provide the user with the visual information suggesting that the initial selection item 420 needs to be selected in order to contact the target organization. In some embodiments, providing the initial selection item 420 comprising the determined sequence of several first digits may help the user to visually distinguish one advertising target organization from another advertising target organization, and one advertising campaign from another advertising campaign.

The receiving routine 504 is configured to receive a request 450 for digital content item (for example, the first request 451 for the first customized digital content item or the second request 452 for the second customized digital content item) from the electronic device 102 (for example, the first electronic device 401 or the second electronic device 402).

The request 450 for digital content item may also comprise a user ID 455. As described above, the user ID may be any identification related to the user and/or the electronic device 102. For example, the user ID may be a user-associated cookie, the device ID associated with the electronic device 102 (the electronic device identifier), or the both.

The request 450 for digital content item may also comprise information about the current web page the user is at, and the target organization the user of the electronic device 102 is trying to contact.

In at least one embodiment, the indication of the user ID associated with the user may be received before routing the call. For example, the request 450 for the digital content item and/or the indication of the user ID 455 may be sent by the electronic device 102 right after the user has selected the selection item 420 on the user-specific digital display screen 107 (also referred to herein as electronic device display screen 107) associated with the electronic device 102, but before the phone dials any number.

Having received the request 450 for the digital content item and the user ID 455, the receiving routine 504 provides the user ID 455 to the personalization routine 506.

The personalization routine 506 is configured to determine whether any user profile related to the received user ID 455 is available in the user profile database 128. The personalization routine 506 is configured to access the user profile database 128, and determine whether it stores information in association with the user ID 455. As mentioned above, the user ID 455 may comprise the user-associated cookie, the device ID, or the both. The personalization routine 506 may then determine whether the user profile database 128 has one or more user profiles associated with the user ID 455.

In at least one embodiment, the personalization routine 506 may verify whether the identified one or more user profiles in the user profile database 128 has one or more parameters pre-defined by the target organization. For example, the target organization may pre-define that the user profile needs to comprise a gender of the user.

If none of the profiles associated with the user ID include the pre-defined parameters, personalization routine 506 may determine that the information in association with the user ID is insufficient to identify the one or more parameters pre-defined by the target organization. In such event, the personalization routine 506 may conclude that the user profile database 128 does not include data for generating a call enrichment data packet associated with the call.

If the one or more user profiles 528 corresponding to the user ID and with pre-defined parameters have been identified, the personalization routine 506 proceeds to determine a contacting user profile 530. After determining the one or more user profiles 528 corresponding to the user ID 455, the personalization routine 506 determines the contacting user profile 530. In at least one embodiment, the contacting user profile 530 is selected by selecting the latest updated user profile from the received user profiles 528. Alternatively, the personalization routine 506 may select the user profile that is the most complete in order to determine the contacting user profile 530. In another embodiment, the personalization routine 506 is also configured to determine, based on data received from the user profile database 128, a most recent user profile corresponding to the user ID and use it as the contacting user profile 530. It should be understood that a combination of these and other methods to determine the contacting user profile 530 from a plurality of the received user profiles 528 may be used.

Depending on the data received from the personalization routine 506, the content generation routine 508 is configured to access the telephone number repository 140 and determine the default telephone number (for example, the first default telephone number 212, depicted in FIG. 2) for the target organization or an available unique number (for example, the first unique number 204, depicted in FIG. 2) from the pool of unique numbers 142.

In some embodiments, the content generation routine 508 is configured to access the digital content item database 126 and select at least a portion of the customized digital content item 570. For example, the content generation routine 508 may select from the digital content item database 126 an image to be presented to the user on the electronic device display screen 107.

The content generation routine 508 is configured to generate a call enrichment data packet 535 if the user profile database 128 finds one or more user profiles 528 related to the user ID and if the contacting user profile 530 is determined. The call enrichment data packet 535 may comprise at least a portion of data from the contacting user profile 530. For example, the call enrichment data packet 535 may comprise an indication of the target organization, time and date of the call, location of the caller at the time of the call, etc. The content generation routine 508 may then store the call enrichment data packet 535 in the user profile database 128 or in the call summary database 160.

Still in the event of availability of the data, the content generation routine 508 is also configured to generate the customized digital content item 570 comprising an indication of the default telephone number (for example, the first default telephone number 212, depicted in FIG. 2). The indication of the default telephone number includes a trigger for including the call enrichment data packet 535 when routing the call initiated by the user to the default telephone number.

In at least one embodiment, the call enrichment data packet 535 may be included in the customized digital content item 570 and transmitted, along with the default number, to the electronic device 102.

The content generation routine 508 is then configured to transmit the customized digital content item 570 to the electronic device 102, the external display device 130, or the both, so that the electronic device display screen 107 and/or the external display screen 132 display the customized digital content item 570.

In the event that the user profile database 128 does not have any data available associated with the user ID 455, the call enrichment data packet 535 is not generated. Instead, a notification 544 is received by the content generation routine 508 from the personalization routine 506.

The content generation routine 508 is configured to access the pool of unique numbers 142 and to determine an available unique number of the pool of unique numbers 142. The content generation routine 508 is also configured to generate the customized digital content item 570 comprising an indication of the available unique number.

The content generation routine 508 then maps the customized digital content item 570 and the available unique number to the user ID 455. The mapping data of the customized digital content item 570, the available unique number and the user ID 455 is also generated. In at least one embodiment, the content generation routine 508 may store the mapping data in the call summary database 160. For example, the call mapping data may be stored and updated by the content generation routine 508. For example, mapping of the customized digital content item 570 and the available unique number to the user ID 455 may be maintained for about 60 seconds or several minutes during the call. In some non-limiting embodiments of the present technology, the mapping can be stored and used for generating campaign statistics for provision to the campaign organization.

In some embodiments, the pool of unique numbers may have several unique telephone numbers. For example, the pool of unique numbers may have ten unique telephone numbers. If the content generation routine 508 cannot identify an available unique number (for example, all unique numbers are being used by other users at the moment), then the content generation routine 508 identifies the default number for the target organization. In the event when the user profile database 128 does not contain any corresponding user profile and the pool of unique numbers has no more unique telephone numbers available, the call enrichment data packet 535 is generated and comprises data received from the electronic device 102. For example, the call enrichment data packet 535 may comprise user ID, cookies and history received from the electronic device 102, as well as time and date of the call.

The content generation routine 508 then transmits, to the call routing routine 510, the customized telephone number, which is either the default number or the available unique number. If the customized telephone number is the default telephone number, the call enrichment data packet 535 is also transmitted to the call routing routine 510.

The call routing routine 510 is configured to receive a notification of the initiating the call and to route the telephone call to the customized telephone number, which is either the default number or the available unique number.

In at least one embodiment, if the customized digital content item 570 comprises the indication of the default telephone number, and the indication of the default telephone number includes a trigger for including the call enrichment data packet 535 when routing the call to the default number, the call routing routine 510 transmits the call enrichment data packet 535 to a target organization receiver 190 and/or a target organization database 194.

In some embodiments, the call routing routine 510 may access the call summary database 160 in order to search for the call enrichment data packet 535 corresponding to the call being routed. The call routing routine 510 may then transmit the identified call enrichment data packet 535 to the target organization receiver 190 and/or the target organization database 194.

In some embodiments, the mapping of the customized digital content item 570 and the available unique number to the user ID 455 may be maintained by the selection application 124 for a pre-determined period of time after the customized digital content item has been displayed to the user. The predetermined period of time may be, for example, one or several minutes, several hours or until provided as a report to the target organization receiver 190. Upon expiry of the pre-determined period of time, the call routing routine 510 may return the available unique number back to the pool of unique numbers 142. The return of the available unique number may cause dis-association of the available unique number from the customized digital content item 570. It should be understood that engaging and returning back of the unique number to the pool of unique numbers may be implemented by changing the status of the unique number between "available" and "unavailable".

In at least one embodiment, the indication of the user ID associated with the user may be received during routing of the call. In such embodiment, the electronic device 102 already dials a default phone number provided by the browser of the electronic device 102 or displayed on the external display device 130 (such as a billboard), and, during routing of the call, the request 450 for the digital content item and/or the indication of the user ID 455 is sent by the electronic device 102 to the selection application 124 of the server 118.

The analyzing routine 512 is configured to collect and analyze data regarding the call and its routing by the selection application 124. The analyzing routine 512 is also configured to analyze data stored in the call summary database 160.

In at least one embodiment, the analyzing routine 512 may generate a conversion profile associated with the target organization. The conversion profile may be based on occurrence of the call routed to the target organization in response to displaying of the digital content item 570.

For example, after the call from the electronic device 102 has been routed, the selection application 124 may request the electronic device 102 to provide a report with regards to the phone call routed. Alternatively, the selection application 124 may determine, based on the time of employment (use) of the customized telephone number, the occurrence and the duration of the call. This information may also be used in the analysis.

The conversion profile associated with the target organization and/or advertising campaign of the target organization may provide a ratio of a number of goal achievements to the number of times the initial digital content item was displayed along with the corresponding advertisement. The goal achievements may be, for example, actual conversations occurred as a result of an advertising campaign. The goal achievements may be, in another example, requests for the customized digital content item being received by the selection application 124 corresponding to the same advertising campaign. The conversion profile may also include other ratios between the number of times the initial digital content item was displayed, the number of requests for a customized digital content item have been received, and the number of actual calls.

The conversion profile may be stored in the call summary database 160 or another database operatively connected to the server 118.

Analyzing the collected data and determining the conversion profile may permit assessing efficiency of the advertising campaigns and sub-campaigns.

The selective use of either the default telephone number or the pool of unique numbers may be instrumental in providing information for generating the conversion profile for the target organization. The conversion profile may take into account whether the data has been available in the user profile database 128 or the new unknown earlier user has tried to contact the target organization.

In some embodiments, the call enrichment data packets 535 generated during the advertising campaign or sub-campaign may be analyzed. As the call enrichment data packets 535 may comprise statistical information with regards to the user, the audience of the advertisement campaign may be determined and compared with the target audience of the advertisement campaign.

The user IDs that were not found in the user profile database 128 and the corresponding newly generated profiles may also be analyzed. Although such newly generated profiles may have limited data, they may nevertheless provide additional information with regards to newly attracted users.

The analyzing routine 512 may then provide the statistical data with regards to efficiency of the target organization's advertising campaign or sub-campaign. The analyzing routine 512 may be configured to transmit such statistical data to the target organization receiver 190, and/or the target organization database 194, regularly and/or after the predetermined period of time of the advertising campaign, or sub-campaign.

In at least one embodiment, the selection application 124 generates a database enrichment data packet 537 based on the data received from the electronic device 102 and collected and analyzed by the selection application 124. The database enrichment data packet 537 may be stored, for example, in the user profile database 128.

For example, if there was already the corresponding user profile for the user ID received from the electronic device 102, and the user profile database 128 has found data for generating the call enrichment data packet 535, the database enrichment data packet 537 may comprise various data, such as, for example, the call enrichment data packet 535, partial or full data comprised in the request 450 for the digital content item, etc. For example, the database enrichment data packet 537 may comprise the information regarding the target organization contacted by the user, the date and time of the call, etc. The database enrichment data packet 537 may be stored in the user profile database 128 separately and/or it may be integrated with the corresponding one or more user profiles.

In at least one embodiment, if there was already the corresponding user profile for the user ID received from the electronic device 102, that user profile may be updated by the analyzing routine 512. For example, analyzing routine 512 may update the user profiles that correspond to the received user IDs and to the requests treated by the selection application 124. The user profile update may include data comprised in the requests received and treated by the selection application 124, and data regarding the call, and the corresponding advertising campaign or sub-campaign. Data about the target organization may also be included in the updated user profile in the user profile database 128.

Figure 6:
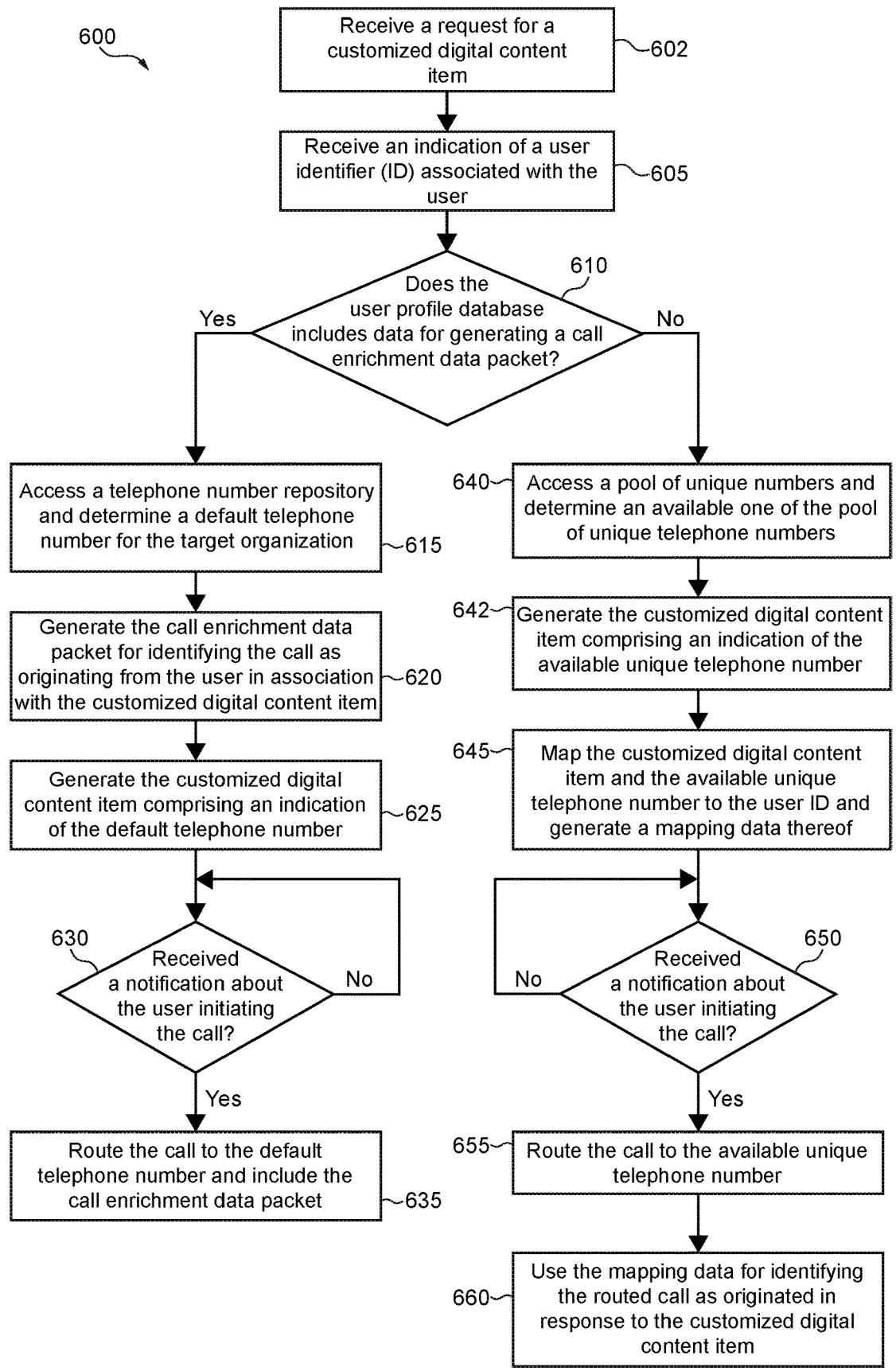
FIG. 6 depicts a block diagram of a flow chart of a method for routing a call from the electronic device to a target organization, the method executable within the system of FIG. 1 in accordance with non-limiting embodiments of the present technology.

FIG. 6 depicts a computer-implemented method 600 for routing a call from the electronic device 102 to the target organization. For ease of understanding, the description of the method 600 below also provides references to FIGS. 1-5.

In order to place the telephone call and to reach the target organization, the user needs to dial a telephone number. The initial selection item 420 may be presented to the user of the electronic device 102 suggesting that this item has to be selected in order to contact the target organization by phone. In some embodiments, the initial selection item 420 is presented in electronic device display screen 107. In order to contact the target organization via the telephone, the user may click on the selection item 420 on the electronic device display screen 107 or otherwise select the selection item 420.

With regards to the scenario when the external display screen 132 displays the advertisement, the initial selection item 420 may be presented on the external display screen 132 of the external display device 130. The initial selection item 420 presented on the external display screen 132 may include a full initial telephone number. The full initial telephone number may be provided by the initial content selection routine 502 to the particular external display screen 132 based on the time of the day and/or location of the external display screen 132, or other characteristics related to the external display screen 132 and/or advertising campaign or sub-campaign. In order to contact the target organization via a telephone call, the user may start dialing the telephone number presented on the external display screen 132.

In some embodiments, the sensor 134 of the external display screen 132 may detect the electronic device 102 and the user ID 455, and then transmit that user ID 455 to the selection application 124. The user ID 455 transmitted from the external display screen 132 may thus provide to the selection application 124 data about location of the user (for example, at which external display screen 132 the user is looking at). It should be noted that having a separate phone number shown on each external display screen 132 would be costly, therefore having a sensor 134 and/or camera 136 permits identifying the user.

At step 602, the receiving routine 504 receives, from the electronic device 102, the request 450 for a customized digital content item. The customized digital content item needs to be destined to the user but does not have to be personalized for the user. Although the customized digital content item is requested in order to be presented (shown) to the user, the customized digital content does not have to be selected specifically for the user (in a sense of on-line targeted content is selected for each given user based on her or his profile). In other words, the advertisement shown to the user may be selected for a group of users (for example, based on average interest profile or based on a profile of a surrounding geographical area, such as a mall or the like).

At step 605, the receiving routine 504 also receives 605 the indication of the user ID 455 associated with the user. As described above, the request 450 for a customized digital content item may comprise a user ID 455 and the identification of the selection item. For example, the identification of the selection item may include data regarding the target organization.

In some embodiment, receiving an indication of a user ID 455 associated with the user is executed during routing of the call. Alternatively, the receiving of the indication of the user ID 455 associated with the user may be executed before routing the call. In some embodiments, step 602 and step 605 may be executed simultaneously.

With reference to FIG. 4, for example, the first user 418 may browse the internet on the first electronic device 401 and an advertisement of a target organization may be displayed on the electronic device display 407. The initial digital content item 420 may be displayed on the electronic device screen 407 as a part of the advertisement. As described above, the initial digital content item 420 may provide a suggestion that, by selecting the initial digital content item 420, the user would be able to contact the target organization by phone. After the first user 418 has selected the initial digital content item 420, the indication of the user ID (not depicted in FIG. 4) included in the first request 451 for the first customized digital content item for the first user 418 is sent to the selection application 124. In this scenario, the call is routed after the selection application 124 receives the indication of the user ID associated with the user and selects the customized digital content item 421, according to the method and system described herein, and transmits it back to the first electronic device 401.

Alternatively, the first user 418 may start dialing a phone number suggested by the initial digital content item 420 and the first electronic device 401 may send the user ID to the server 118. The server 118 therefore receives the indication of the user ID associated with the first user 418 during the routing of the call.

With regards to the scenario when the external display screen 132 displays the advertisement, the receiving routine 504 may receive the request 450 for a customized digital content item and the user ID from the external display device 130.

Referring to FIG. 3, the sensor 134 may determine the user ID (not depicted in FIG. 3) before the user is presented with the initial digital content item 320 or the customized digital content item, and before the electronic device 102 dials the phone number provided on the advertisement. In this scenario, the selection application 124 may thus receive the user ID before routing the call.

In yet another scenario, the user 318 may see an advertisement on the external display screen 132 and start dialing the phone number displayed on the external display screen 132 by the initial digital content item 320. The selection application 124 may thus receive the user ID while routing the call.

At step 610, the personalization routine 506 determines, based on the user ID 455, if the user profile database 128 includes user profiles corresponding to the user ID 455. The personalization routine 506 searches the user profile database 128 to identify one or more user profiles corresponding to the user ID 455.

As discussed above, it may be possible that the user ID 455 cannot be determined by the personalization routine 506 because there is no data regarding the user in the user profile database 128.

If one or more user profiles, corresponding to the user ID 455, are found in the user profile database 128, the personalization routine 506 determines the contacting user profile 530. As discussed above, the analysis of the user profiles 528 found in the user profile database 128 may be conditioned by the pre-defined parameters that need to be found in the user profiles 528 in order to determine the contacting user profile 530.

The personalization routine 506 then generates a call enrichment data packet 535 associated with the call. The call enrichment data packet 535 may comprise the user ID 455, partial or all data of the contacting user profile 530, as well as other addition information. For example, the call enrichment data packet 535 may also comprise an indication of the target organization, time and date of the call, location of the caller at the time of the call, etc.

At step 615, in response to availability of data for generating the call enrichment data packet, the content generation routine 508 accesses the telephone number repository 140 and determines the default telephone number for the target organization.

At step 620, the content generation routine 508 generates call enrichment data packet 535 for identifying the call as originating from the user in association with the customized digital content item.

At step 625, the content generation routine 508 generates the customized digital content item 570 comprising an indication of the default telephone number. The indication of the default telephone number includes a trigger for including the call enrichment data packet 535 when routing the call initiated by the user to the default telephone number.

The digital content item 570 is then transmitted to the electronic device 102 or the external display device 130, or the both. The electronic device display screen 107 and/or the external display screen 132 may then display the customized digital content item 570.

At step 630 the call routing routine 510 is configured to receive a notification of the user initiating the call.

At step 635, in response to the user initiating the call, the call routing routine 510 routs the call to the default number of the target organization. The call routing routine 510 may also transmit the call enrichment data packet 535 to the target organization receiver 190 in order to identify the call as originating from the user in association with the customized digital content item 570.

Alternatively, the call enrichment data packet 535 may be transmitted to the electronic device 102 in order to be sent from the electronic device 102 to the target organization receiver 190 when the user dials the default number.

In at least one embodiment, the call enrichment data packet 535 is mapped with the user ID 455. This mapping data permits identifying the call as originating from the particular user in association with the customized digital content item 570. The collected data on the calls may be then stored in the call summary database 160 and analyzed by the analyzing routine 512.

The analyzing routine 512 is configured to analyze the call enrichment data packets 535 along with the mapping data collected for the advertising campaign and/or for the sub-campaign. The call enrichment data packet 535 provides identification of the user ID 455, as well as data with regards to the call, with regards to the corresponding advertisement campaign, and with regards to the customized digital content item 570 provided for the corresponding caller. The call enrichment data packet 535 may also comprise other data, such as, for example, user cookies and search (browsing) history that led to the advertisement.

As discussed above, the call enrichment data packet 535 may comprise information that may be analyzed in order, for example, to identify the user and have information about the call, and to analyze the efficiency of the advertising campaign. Such information may help, for example, analyze advertising strategy, one or more advertising campaigns, and/or improve targeting of the advertising audiences.

The call enrichment data packet 535 may be transmitted to the target organization receiver 190 along with the call or after the call. For example, the call enrichment data packet 535 may be transmitted to the target organization database 194 directly. Alternatively, the call routing routine 510 may store the call enrichment data packet 535 in the call summary database 160.

The analyzing routine 512 may statistically analyze the call summary database 160 in order to provide, for example, statistical data with regards to efficiency of the target organization's advertising campaign or sub-campaign.

In response to non-availability of data for generating the call enrichment data packet, i.e. in response to non-availability of the contacting user profile 530, the content generation routine 508 may receive a notification from the personalization routine 506.

At step 640, the content generation routine 508 is configured to access the pool of unique numbers 142 and to determine an available unique number of the pool of unique numbers 142.

At step 642, the content generation routine 508 is configured to generate the customized digital content item 570 comprising an indication of the available unique number.

At step 645, the content generation routine 508 is configured to map the customized digital content item 570 and the available unique number to the user ID 455. The mapping data of the customized digital content item 570, the available unique number and the user ID 455 are also generated.

At step 650, the call routing routine 510 is configured to receive a notification of the initiating the call.

At step 655, the call routing routine 510 is configured to rout the call to the determined earlier available unique number.

At step 660 the mapping data may be used by the selection application 124 in order to identify the routed call as originated in response to the customized digital content item. As described above, the analyzing routine 512 may store the mapping data in the call summary database 160. The analyzing routine 512 may also analyze the mapping data collected in the call summary database 160 in order to provide, for example, statistical data with regards to the target organization and/or the target organization's advertising campaign or sub-campaign.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer-implemented method for routing a call from an electronic device, associated with a user, to a target organization, the method being executed by a server coupled to:
   a user profile database maintaining one or more user profiles of one or more users associated with one or more services;
   a digital content display;
   a content item database comprising a plurality of digital content items;
   a telephone number repository hosting:
      a default telephone number and
      a pool of unique numbers;
   the method comprising:
      receiving a request for a customized digital content item from the content item database, the customized digital content item being destined to the user and not being personalized for the user;
      receiving an indication of a user identifier (ID) associated with the user;
      determining, based on the user ID, if the user profile database includes data for generating a call enrichment data packet associated with the call;
      in response to availability of data for generating the call enrichment data packet:
         generating the customized digital content item comprising an indication of the default telephone number, the indication of the default telephone number including a trigger for including the call enrichment data packet when routing the call initiated by the user to the default telephone number; and
         in response to the user initiating the call, routing the call to the default number and including the call enrichment data packet for identifying the call as originating from the user in association with the customized digital content item;
      in response to non-availability of data for generating the call enrichment data packet:
         generating the customized digital content item comprising an indication of one of the pool of unique numbers;
         mapping the customized digital content item and the one of the pool of unique numbers to the user ID and generating a mapping data of the customized digital content item, the one of the pool of unique numbers and the user ID; and
         in response to the user initiating the call:
            (i) routing the call to the one of the pool of unique numbers; and
            (ii) using the mapping data for identifying the routed call as originated in response to the customized digital content item.

2. The method of claim 1, wherein the digital content display is one of a user-independent digital content display and a user-specific digital display associated with the electronic device.

3. The method of claim 1, wherein the user ID is one of a user-associated cookie and a device ID associated with the electronic device.

4. The method of claim 3, wherein determining, based on the user ID, if the user profile database includes data for generating the call enrichment data packet comprises
   accessing the user profile database and
   determining if it stores information in association with the user-associated cookie or the device ID,
      the information being sufficient to identify at least one parameter associated with the user,
      the at least one parameter having been pre-defined by the target organization in association with the customized digital content item.

5. The method of claim 1, wherein the mapping of the customized digital content item and the one of the pool of unique numbers to the user ID comprises maintaining the mapping for a pre-determined period of time after the customized digital content item has been displayed to the user.

6. The method of claim 5, wherein upon expiry of the pre-determined period of time, the method further comprises:
   returning the one of the pool of unique numbers back to the pool of unique numbers.

7. The method of claim 6, wherein the returning causes dis-association of the one of the pool of unique numbers from the customized digital content item.

8. The method of claim 1, wherein the method further comprises generating a conversion profile associated with the target organization, the conversion profile being based on occurrence of the call routed to the target organization in response to the displaying of the customized digital content item.

9. The method of claim 8, wherein a selective use of one of
   the default telephone number and
   the pool of unique numbers
      is instrumental in providing information for generating the conversion profile for the target organization.

10. The method of claim 1, wherein the receiving of the indication of the user ID associated with the user is executed before routing the call.

11. The method of claim 1, wherein the receiving of the indication of the user ID associated with the user is executed during routing the call.

12. The method of claim 1, further comprising:
   generating a database enrichment data packet comprising the mapping data; and storing the database enrichment data packet in the user profile database.

13. The method of claim 1, wherein determining, based on the user ID, if the user profile database includes the data for generating a call enrichment data packet associated with the call further comprises:
determining, based on data received from the user profile database, a most recent user profile corresponding to the user ID.

14. A system for routing a call from an electronic device, associated with a user, to a target organization, the system comprising a server coupled to:
a user profile database maintaining one or more user profiles of one or more users associated with one or more services;
a digital content display;
a content item database comprising a plurality of digital content items;
a telephone number repository hosting:
a default telephone number and
a pool of unique numbers;
the server comprising a processor configured to:
receive a request for a customized digital content item from the content item database, the customized digital content item being destined to the user and not being personalized for the user;
receive an indication of a user identifier (ID) associated with the user;
determine, based on the user ID, if the user profile database includes data for generating a call enrichment data packet associated with the call;
in response to availability of data for generating the call enrichment data packet:
generate the customized digital content item comprising an indication of the default telephone number, the indication of the default telephone number including a trigger for including the call enrichment data packet when routing the call initiated by the user to the default telephone number; and
in response to the user initiating the call, route the call to the default number and include the call enrichment data packet for identifying the call as originating from the user in association with the customized digital content item;
in response to non-availability of data for generating the call enrichment data packet:
generate the customized digital content item comprising an indication of one of the pool of unique numbers;
map the customized digital content item and the one of the pool of unique numbers to the user ID and generate a mapping data of the customized digital content item, the one of the pool of unique numbers and the user ID; and
in response to the user initiating the call:
(i) route the call to the one of the pool of unique numbers; and
(ii) use the mapping data for identifying the routed call as originated in response to the customized digital content item.

15. The system of claim 14, wherein the digital content display is one of a user-independent digital content display and a user-specific digital display associated with the electronic device.

16. The system of claim 14, wherein the user ID is one of a user-associated cookie and a device ID associated with the electronic device.

17. The system of claim 16, wherein determining, based on the user ID, if the user profile database includes data for generating the call enrichment data packet comprises
accessing the user profile database and
determining if it stores information in association with the user-associated cookie or the device ID,
the information being sufficient to identify at least one parameter associated with the user,
the at least one parameter having been pre-defined by the target organization in association with the customized digital content item.

18. The system of claim 14, wherein the processor is further configured to generate a conversion profile associated with the target organization, the conversion profile being based on occurrence of the call routed to the target organization in response to the displaying of the customized digital content item.

19. The system of claim 18, further comprising a call summary database configured to store the conversion profile associated with the target organization.

20. The system of claim 14, wherein the user ID is a device ID, and the digital content display is a user-independent digital content display, the user-independent digital content display further comprising a sensor configured to detect the electronic device and to collect the device ID.

* * * * *